US007142952B2

(12) United States Patent
Mekemson et al.

(10) Patent No.: US 7,142,952 B2
(45) Date of Patent: Nov. 28, 2006

(54) METHOD AND APPARATUS FOR PAVEMENT CROSS-SLOPE MEASUREMENT

(76) Inventors: James R. Mekemson, 3504 Littledale Rd., Kensington, MD (US) 20895; Nicolas Gagarin, 3504 Littledale Rd., Kensington, MD (US) 20895

( * ) Notice: Subject to any disclaimer, the term of this patent is extended or adjusted under 35 U.S.C. 154(b) by 909 days.

(21) Appl. No.: 09/799,088

(22) Filed: Mar. 6, 2001

(65) Prior Publication Data
US 2002/0013644 A1    Jan. 31, 2002

Related U.S. Application Data

(60) Provisional application No. 60/187,031, filed on Mar. 6, 2000.

(51) Int. Cl.
*G05D 1/00* (2006.01)
*G05D 3/00* (2006.01)
*G01C 21/32* (2006.01)

(52) U.S. Cl. .......................... 701/1; 701/25; 701/208; 701/223; 73/146

(58) Field of Classification Search ............... 701/1, 701/210, 223, 37, 39, 25, 208, 214; 73/146
See application file for complete search history.

(56) References Cited

U.S. PATENT DOCUMENTS 4,674,327 A * 6/1987 Swindall et al. ............... 73/146
4,700,223 A * 10/1987 Shoutaro et al. ............. 348/148
5,075,772 A * 12/1991 Gebel .......................... 348/135
5,440,923 A * 8/1995 Arnberg et al. ............... 33/341
5,467,190 A * 11/1995 Desmarais et al. ......... 356/459
6,199,001 B1 * 3/2001 Ohta et al. .................... 701/208
6,245,014 B1 * 6/2001 Brainard, II ................ 128/898
6,268,825 B1 * 7/2001 Okada .................... 342/357.13

* cited by examiner

*Primary Examiner*—Thomas G. Black
*Assistant Examiner*—Brian J. Broadhead
(74) *Attorney, Agent, or Firm*—James Creighton Wray (57) ABSTRACT

Pavement cross-slope is measured at highway speeds by mounting a ring-laser gyroscope on a vehicle and measuring deviation of the transverse slope of the vehicle. Precise laser distance measuring devices are mounted transversely with respect to the vehicle at significantly distant points to measure vehicle roll by measuring displacement of the laser distance measuring units from the pavement. The difference between at rest measurements of the laser distance measuring devices, the dynamic measurements produced by those devices and the relation of the dynamic measurement to the distance between the measurements provides the exact value of vehicle roll with respect to the pavement. That exact value of vehicle roll is compared with the ring gyro angular measurement to produce a precise measurement of pavement slope. A positional device is mounted on the vehicle for determining the position of the vehicle on the roadway. A computer is mounted on the vehicle and a recording device is mounted on the vehicle to record the precise slope of the roadway at the precise position on the pavement being measured.

18 Claims, 9 Drawing Sheets
(3 of 9 Drawing Sheet(s) Filed in Color)

| | SES ROSANcs (Cross Slope) (C) 1999 | | |
|---|---|---|---|
| Casename | Untitled | Speed | Interval |
| Data Labels [All][Roll] | 0 | ◊64 KPH | ◊1 inches |
| Roll Angle | | ◊40 MPH | ◊25.4 mm |
| Roll Attitude Rate | | [Initialize C-Board] | [Acquire C-Data] |
| Intertial Longitude | | | |
| Inertial Latitude | | | |
| True Heading | | [Acquire Ni and C-Data] | |
| Pitch Angle | | | |
| Pitch Attitude Rate | | [Reset C-Board] | |
| Universal Time Code | | | |
| Ground Speed | | | |
| Flight Path Angle | | [Ni-Pre-Process] | |
| Body Pitch Rate | | | |
| Body Longitudinal Acc | | [Browse Left and Right Laser Data (Allow time to read the data)] | |
| Body Lateral Acceleration | | [Find Markers] Height (mm) Width (mm) | |
| Body Normal Acceleration | | 10.0  75.0 | |
| Platform Heading | | Loc (pts)  0  0 | |
| Along Track Horizontal Acc | | [Calibrate Slope] L-R Height (mm) Slope Correction | |
| Cross-Track Horizontal Acc | | 0.00000  0.00000000 | |
| Vertical Acceleration | | Pulser Distance (mm)  0.000000 | |

| Client desired accuracy | | |
|---|---|---|
| Max Elevation Error | Lane width | Max Cross-Slope Error |
| 0.03 feet | 12 feet | 0.0025 ft/ft  0.25 % |

LTN-92 Resolution and Accuracy

| Cross Slope Error | Angle Error in Degrees | |
|---|---|---|
| | 0.0109863 | (LTN-92 resolution) |
| 0.00019 | 0.014 | |
| 0.00025 | 0.029 | |
| 0.00050 | 0.050 | (LTN-92 accuracy) |
| 0.00087 | 0.057 | |
| 0.00100 | 0.086 | |
| 0.00150 | 0.115 | |
| 0.00200 | 0.143 | Client desired accuracy |
| 0.00250 | | |

| Bits | Divisions | Deg Resolution |
|---|---|---|
| 14 | 16384 | 180  0.0109863 |

METHOD AND APPARATUS FOR PAVEMENT CROSS-SLOPE MEASUREMENT

BACKGROUND OF THE INVENTION

This application claims the benefit of U.S. Provisional Application No. 60/187,031 filed Mar. 6, 2000.

Pavement cross-slope is an important safety factor in pavement drainage and vehicle cornering. Existing methods are very time consuming and require closing the lanes for which measurement of the cross-slope is desired. Closing lanes on a heavily traveled road presents an element of danger to the crews taking the cross-slope measurements, as well as being an expensive task. Additionally, the existing methods for collecting cross-slope measurements are time consuming, thereby leading to traffic problems for the long time that a stretch of roadway is closed to traffic.

A need exists for a method and apparatus for accurately measuring pavement cross-slope that eliminates the lane closing requirement, reduces the risk to the crew performing the cross-slope measurement, is performed more quickly, and is less costly to perform.

SUMMARY OF THE INVENTION

The present invention is an apparatus and method of measuring pavement cross-slope at highway speeds. The apparatus for obtaining cross-slope measurements uses lasers and a gyroscope. Lasers provide the measurement of vehicle roll with respect to the pavement. The ring-laser gyroscope (RLG) provides the measurement of vehicle roll with respect to a level datum. From these two measurements, the cross slope (roll angle) of the pavement may be determined.

The apparatus for measuring pavement cross-slope may be mounted in a vehicle. The apparatus is capable of making accurate measurements from a vehicle as it travels over pavement at speeds up to 60 miles per hour. The hardware and software system is vehicle based for the accurate measurement of pavement cross slope and may be used at highway speeds of up to 60 mph.

The present invention integrates lasers, a ring-laser gyroscope (RLG), and a distance measuring instrument (DMI). One primary distinction from existing cross-slope measurement apparatus is that existing systems use less real time accurate mechanical or fiber optic (FOG) gyroscopes. The RLG provides a higher level of accuracy with respect to the roll angle (cross-slope) measurement of the gyroscope.

As configured, the present invention is primarily applicable to Portland Cement Concrete pavements or recently constructed Asphaltic Concrete pavement or overlays. A proper cross-slope is important to drainage and cornering of vehicles in curves.

Measurements may also be used for estimating material quantities required for correcting cross-slope deficiencies prior to construction. Inaccurate measurements may lead to gross errors in the estimation of the amount of materials required for correcting the cross-slope of a certain stretch of pavement.

The present invention reduces preconstruction, construction, and post-construction survey costs, reduces safety concerns, provides data in a shorter time period, and provides data for quantity estimates.

These and further and other objects and features of the invention are apparent in the disclosure, which includes the above and ongoing written specification, with the claims and the drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE PREFERRED EMBODIMENTS

Figure 1:
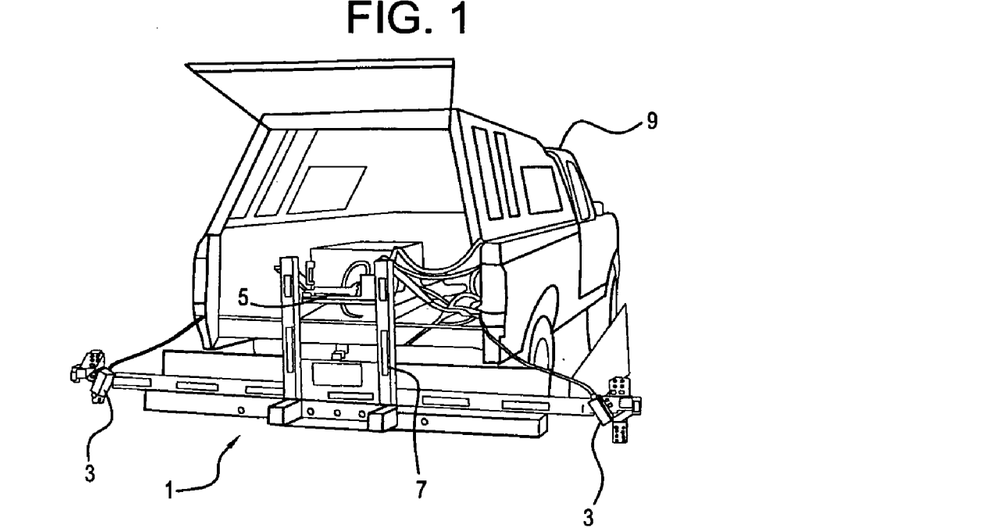
FIG. 1 is a perspective view of the cross-slope measurement apparatus.
Figure 2:
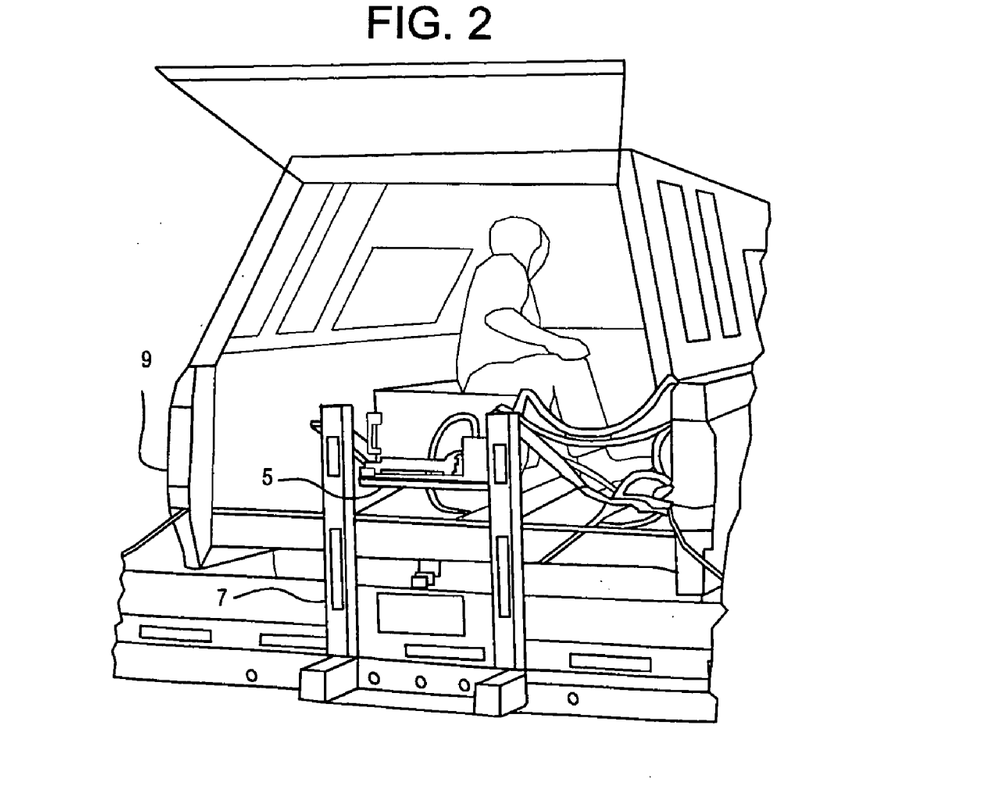
FIG. 2 is a perspective view of the cross-slope measurement apparatus.
Figure 11:
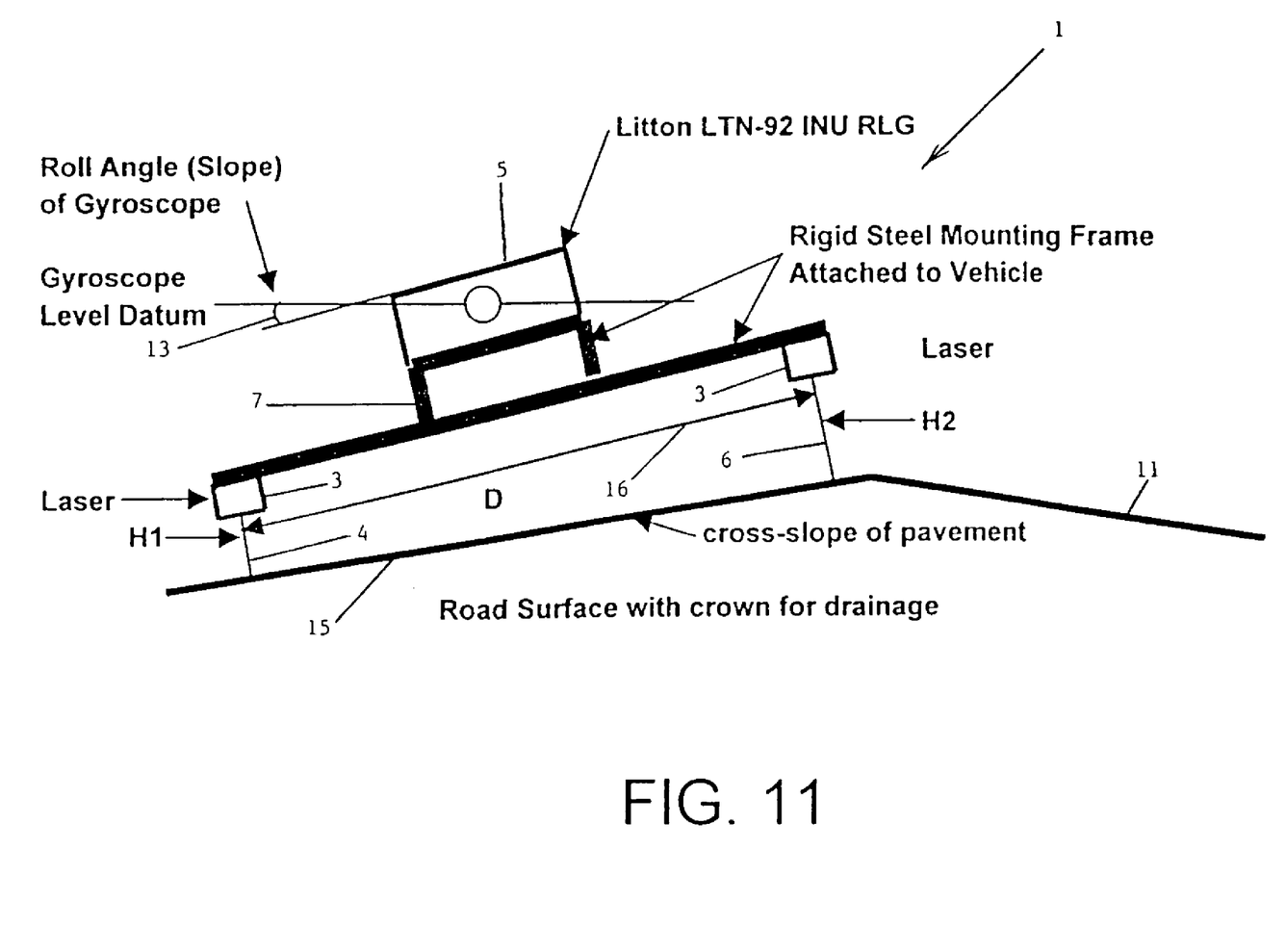
FIG. 11 is a front view of the cross-slope measurement apparatus.

The present invention 1 is an apparatus and method of measuring pavement cross-slope at highway speeds, as shown in FIGS. 1, 2 and 11. The apparatus for obtaining cross-slope measurements uses lasers 3 and a gyroscope 5. Lasers 3 provide the measurement of vehicle 9 roll with respect to the pavement 11. The ring-laser gyroscope (RLG) 5 provides the measurement of vehicle 9 roll with respect to a level datum, shown as angle 13 in FIG. 11. From these two measurements, the cross slope (roll angle) 15 of the pavement may be determined.

The apparatus for measuring pavement cross-slope may be mounted in a vehicle 9. The apparatus is capable of making accurate measurements from a vehicle as it travels over pavement at speeds up to 60 miles per hour. The hardware and software system is vehicle based for the accurate measurement of pavement cross slope and may be used at highway speeds of up to 60 mph.

Figure 5:
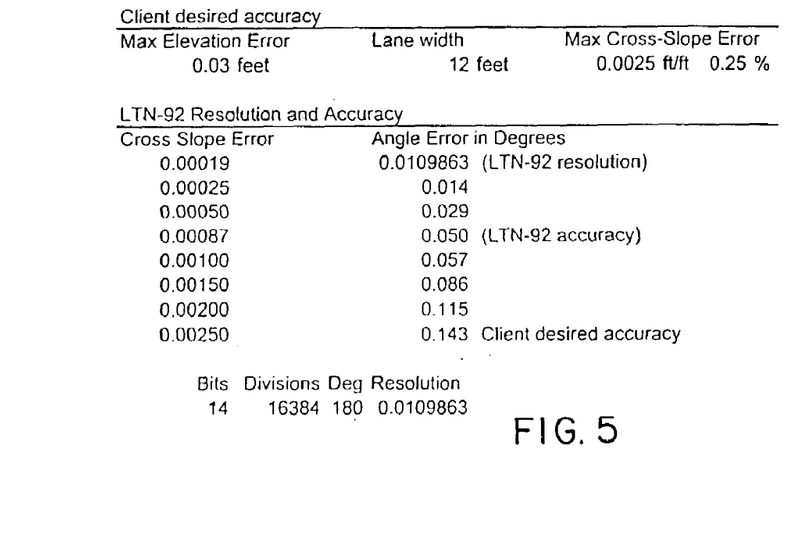
FIG. 5 is a table showing the accuracy of the ring laser gyroscope.

The present invention integrates lasers 3, a ring-laser gyroscope (RLG) 5, and a distance measuring instrument (DMI) or a global positioning system (GPS). One primary distinction from existing cross-slope measurement apparatus is that existing systems use less real time accurate mechanical or fiber optic (FOG) gyroscopes. The RLG provides a higher level of accuracy with respect to the roll angle (cross-slope) 13 measurement of the ring laser gyroscope 5, as shown in FIG. 5.

Figure 3:
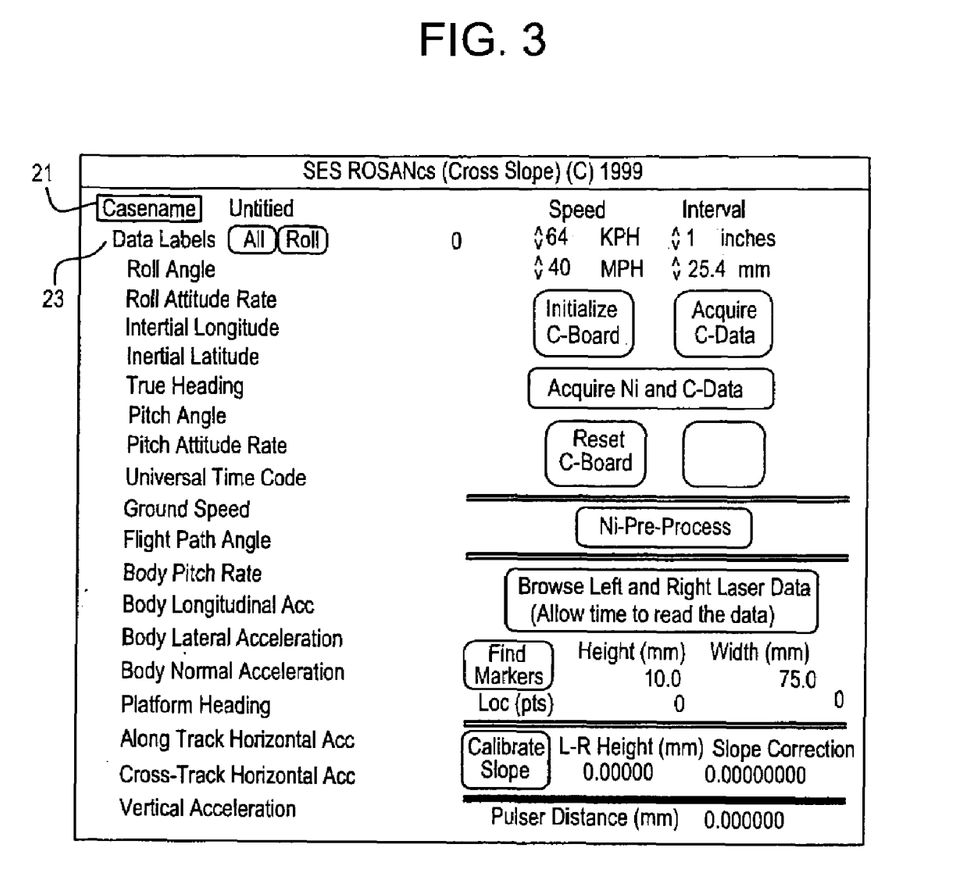
FIG. 3 shows a sample screen from the ROSANcs cross-slope software.

The following procedure is used to acquire cross-slope data using a Litton AeroProducts LTN-92 inertial navigation unit (INU)/Ring Laser Gyroscope (RLG) initialized via its hardware control panel. The RLG may be mounted on the back of a truck, as shown in FIG. 1. The ROSAN Cross-Slope Windows program is then started, as shown in FIG. 3. A case name is selected and entered into the casename field 21. Select "ARINC 429 Labels" as the data from the data labels field 23 to be acquired from Litton AeroProducts LTN-92 inertial navigation unit (INU)/Ring Laser Gyroscope (RLG). The ARINC 429 data acquisition (DAQ) board for LTN-92 INU/RLG is then initialized. The National Instruments (NI) data acquisition (DAQ) board for laser sensors and travel distance measurement instrument (DMI) 5 are then initialized. Both of these units may be connected to either the vehicle 9 transmission sensor or the speed control sensor. The vehicle 9 is then brought up to speed in the travel lane of interest. Any keystroke then begins acquisition of two sets of double buffered data, one for each DAQ board. Data is written to disk files: "casename.lbl" for ARINC 429 label data and "casename.rcs" for laser/DMI data. The ARINC 429 time tag data is saved in the computer's memory. Any keystroke ends the data acquisition period. The ARINC 429 time tag data is then written to a disk as "casename.tt". A file is created as "Casename.raw" that contains (NI) laser and distance pulser DMI data read or global positioning system (GPS) inputs, laser data scaled to engineering units (mm), and cumulative distance for every data point computed from GPS data or from DMI pulse data using previously calibrated pulser distance. Pre-processed data is written to a file saved as "casename.pre".

Figure 4:
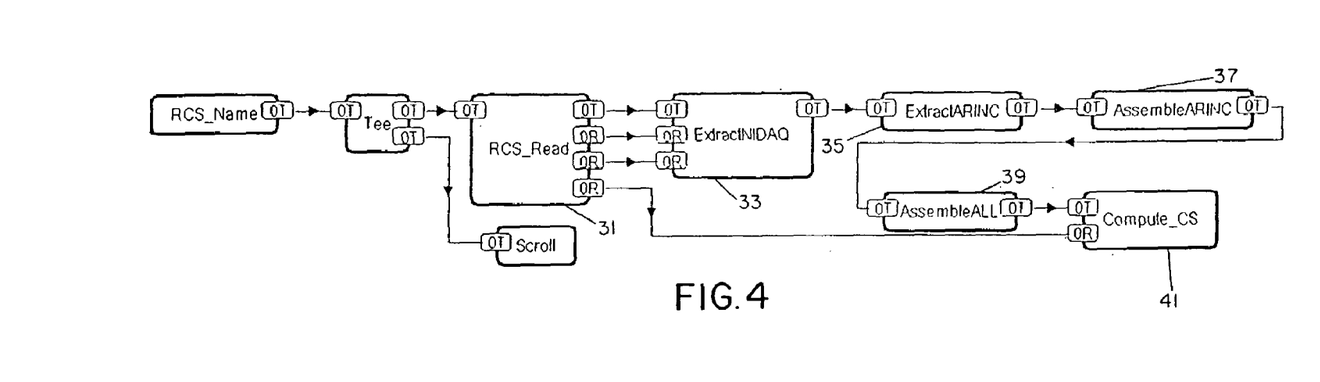
FIG. 4 is a flowchart of the cross-slope analysis and plotting steps using EQS based software

The following procedure is used for cross-slope analysis and plotting steps using an EQS based software program, as shown in FIG. 4. Four files are obtained 31 from the data acquisition period: "casename.pre", "casename.tt", "casename.lbl," and "casename.rcs". The NI DAQ laser data is extracted 33 into a file created as "casename.nid". The ARINC 429 label data is extracted 35 into a file created as "casename.ari". Then, an investigation 37 is made of a match between NIDAQ ("casename.nid") and ARINC ("casename.ari"). The ratio of times of ARINC to NIDAQ (tarinc/tnidaq) is found, and an adjustment factor is set to that ratio. Then, a cross-slope data file is assembled 39 that contains combined ARINC and NIDAQ data. LTN-92 INU latitude and longitude data are too coarse to plot, so compute 41 coordinates & distances with speed and heading data.

Match data for constructing plots, such as with Excel. The trace of the two sources of data are compared and matched using the delta angle and distance factor. The distances between NIDAQ pulser and ARINC coordinates data are compared. Features, such as markers, curves, and bridges) are used to re-calibrate distances. New coordinates are then computed. An estimate is then made of the starting station for data using stations of the features. The data is then exported to an intermediate file.

Figure 6:
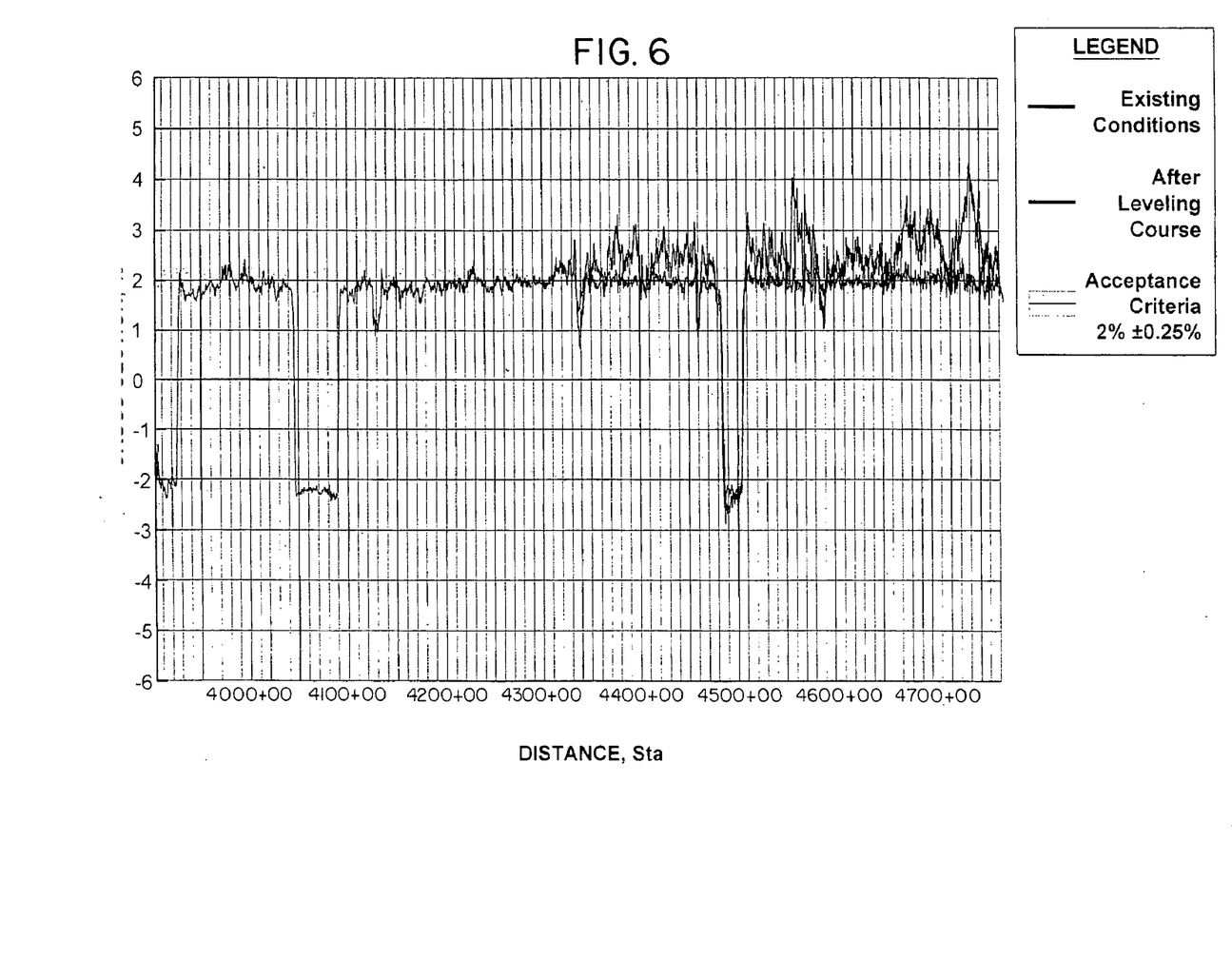
FIG. 6 is a graph of the cross-slope vs. distance for the right lane of a stretch of pavement.
Figure 7:
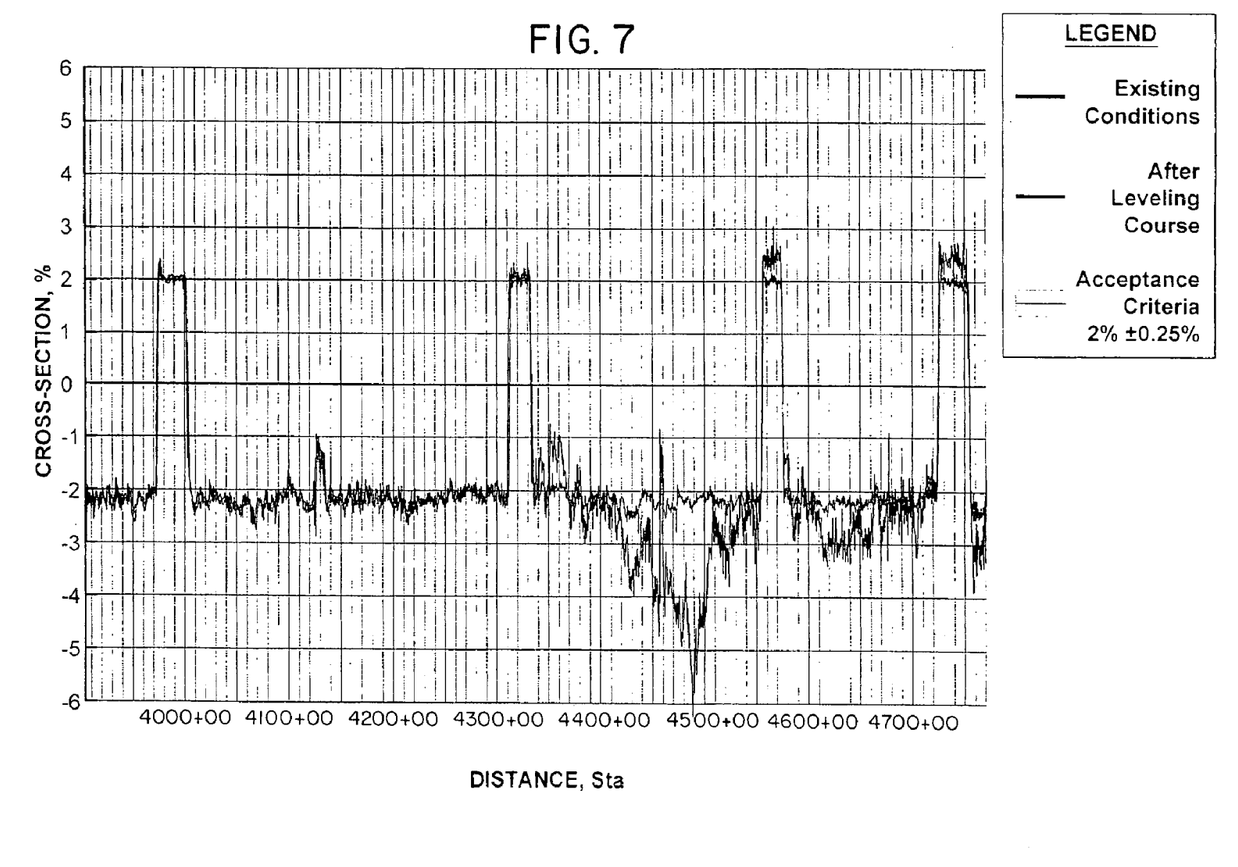
FIG. 7 is a graph of the cross-slope vs. distance for the left lane of a stretch of pavement.
Figure 8:
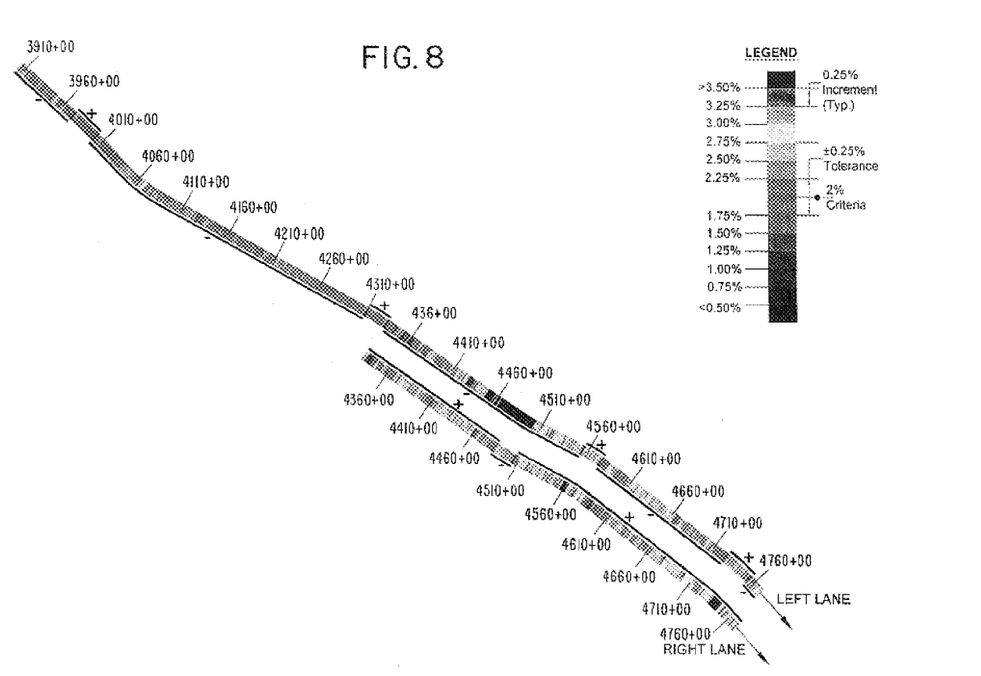
FIG. 8 is a plan view of the existing cross-slope conditions of a stretch of pavement.
Figure 9:
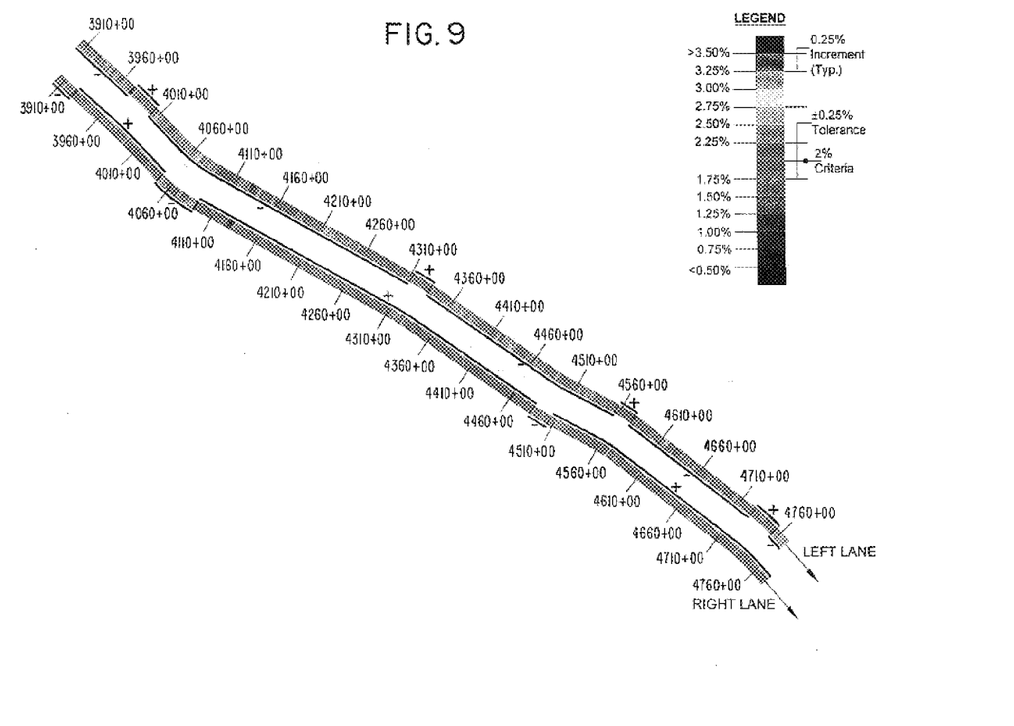
FIG. 9 is a plan view of the cross-slope conditions of the stretch of pavement of FIG. 8 after leveling.
Figure 10:
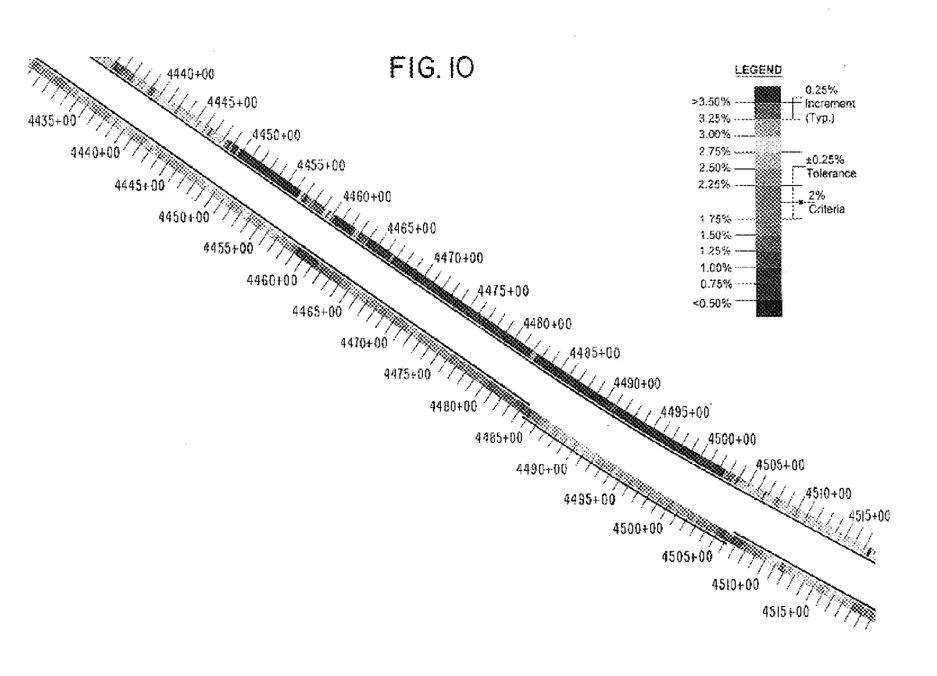
FIG. 10 is plan view of the cross-slope conditions of an existing stretch of pavement.

Cross-section plots, cross-slope vs. distance plots, and plan views of plots of cross-slope (color keyed variance from criteria) vs. distance may then be made using software, such as AutoCAD 2000 with Visual Basic embedded modules. FIGS. 6 and 7 show sample graphs of cross-slope vs. distance for a stretch of pavement. FIGS. 8 and 9 show sample plan views of plots of cross-slope for a stretch of pavement.

FIG. 11 is a front view of the cross-slope measurement apparatus 1 of the present invention. The lasers 3 are mounted on a frame 7, preferably by bolts. The lasers 3 are preferably mounted at a 90 degree angle to the frame 7, pointed straight down at the roadway 11. Preferably, a distance D 16 of approximately 10.6 feet separates the lasers 3. The frame 7 is mounted on a vehicle 9, preferably by bolts. The Litton LTN-92 Inertial Navigation Unit (INU) with ring laser gyroscope (RLG) is mounted on the frame, preferably by bolts.

The difference in laser measured height H1 4 and H2 6 over distance D 16 is equal to the slope of the frame 7 relative to the pavement 11 ((H1−H2)/D=SFrelP). The INU 5 provides slope of the INU and frame 7 relative to a level datum (SFrelLD), as shown by angle 13. The cross-slope (CS) 15 of the pavement 11 is the equal to the slope of INU −slope of the frame relative to the pavement (CS=SFrelLD −SFrelP+C). C is a calibrated correction factor that accounts for any mechanical mounting error of the hardware.

The lasers 3 sample every one (1) inch of vehicle travel. INU RLG roll angle data is taken at a rate of 64 samples per second. Selcom lasers have a measurement range of 128 mm and a resolution of 0.032 mm (128/4000).

The sampled data is collected using a Windows based computer, an ARINC-429 data acquisition board, a National Instruments data acquisition board for the laser data, and a travel distance pulser that is attached to the vehicle's transmission or speed control or ABS unit.

The computer and ring-laser gyroscope may be mounted within a van, and the laser distance measure devices are mounted slightly less than 10 feet apart on rigid beam arms extending from sides of the van.

While the invention has been described with reference to specific embodiments, modifications and variations of the invention may be constructed without departing from the scope of the invention, which is defined in the following claims.

We claim:

1. Pavement cross-slope measuring apparatus comprising a vehicle for moving along a pavement to be measured for cross-slope, a ring-laser gyroscope mounted in the vehicle for determining slope of the vehicle with reference to an imaginary horizontal plane, first and second pavement distance measurement devices mounted on opposite sides of the vehicle for determining distance to the pavement on opposite sides of the vehicle and thereby determining vehicle roll, a computer for comparing the determined vehicle roll with the determined slope of the vehicle and for producing from the comparing slope of the pavement, a positional device mounted on the vehicle for determining position of the vehicle on the roadway, and a recording device connected to the computer and to the positional device for recording slopes and positions of the vehicle on the pavement being measured.

2. The pavement cross-slope measuring apparatus of claim 1, wherein the pavement distance measurement devices comprise precise laser distance measurement devices.

3. The apparatus of claim 1, wherein the positional device comprises a global positioning system device for determining exact global position of the vehicle, and wherein the recording device is connected to the global positioning system device.

4. The apparatus of claim 1, wherein the positional device comprises a travel distance measurement instrument connected to the vehicle for measuring distance travel by the vehicle.

5. Pavement cross-slope measuring apparatus comprising a kit for mounting on a vehicle, the kit having a ring-laser gyroscope fixable with respect to the vehicle for determining transverse slope of the vehicle with reference to an imaginary horizontal plane, first and second pavement distance measurement devices for fixing with respect to opposite sides of the vehicle for determining distance to the pavement from the distance measurement devices, a computer for connection to the pavement distance measurement devices for comparing initial distance to the pavement from each distance measurement device while a vehicle is at rest and for determining distances to the pavement of each distance measurement device when the vehicle is in motion along a pavement to be measured for cross-slope, thereby determining instantaneous vehicle roll, and for connection to the ring-laser gyroscope for comparing the slope of the vehicle with reference to an imaginary horizontal place with the instantaneous vehicle roll, and thereby determining the actual instantaneous vehicle cross-slope, a positional device for mounting on the vehicle for determining position of the vehicle on the roadway, and for connecting to the computer for coordinating instantaneous pavement cross-slope and instantaneous vehicle position on the pavement, a recording device connected to the computer for recording instantaneous cross-slopes and their exact positions on the pavement being measured for cross-slope.

6. The pavement cross-slope measuring apparatus of claim 5, wherein the pavement distance measurement devices comprise precise laser distance measurement devices.

7. The apparatus of claim 5, wherein the positional device comprises a global positioning system device for determining exact global position of the vehicle, and wherein the recording device is connected to the global positioning system.

8. The apparatus of claim 5, wherein the positional device comprises a travel distance measurement instrument connected to the vehicle for measuring distance travel by the vehicle.

9. A pavement cross-slope measuring method, comprising mounting a ring-laser gyroscope in fixed position in a vehicle, mounting pavement distance measurement devices at fixed positions on opposite sides of the vehicle, mounting a computer on the vehicle and connecting the computer to the ring-laser gyroscope and to the distance measurement devices, mounting a positional device on the vehicle, determining distance to the pavement from each of the pavement distance measurement devices while the vehicle is at rest, determining position of the vehicle while the vehicle is at rest, determining distance to the pavement from each of the pavement distance measurement devices while the vehicle is in motion, determining slope of the vehicle from the ring-laser gyroscope, comparing the slope of the vehicle with the measured distances to the pavement on opposite sides of the vehicle, and removing vehicle roll from the measured vehicle slope and thereby determining slope of the pavement, concurrently determining position of the vehicle on the pavement, and recording concurrent determined pavement slopes with determined vehicle positions.

10. The pavement cross-slope measuring method of claim 9, wherein the pavement distance measurement devices comprise precise laser distance measurement devices.

11. The method of claim 10, further comprising pointing the laser distance measurement devices from the vehicle straight down at the pavement.

12. The method of claim 9, wherein the positional device comprises a travel distance measurement instrument connected to the vehicle for measuring distance travel by the vehicle.

13. The method of claim 12, further comprising connecting the positional device to a travel distance pulser attached to a transmission, speed control or automated braking system of the vehicle.

14. The method of claim 9, wherein the positional device comprises a global positioning system device for determining exact global position of the vehicle, and wherein the recording device is connected to the global positioning system.

15. The method of claim 9, further comprising sampling distance to pavement about every one-inch of vehicle travel and sampling vehicle transverse angle about 64 times per second.

16. The method of claim 9, wherein the providing a ring-laser gyroscope comprises providing an inertial navigation unit having a ring-laser gyroscope.

17. The method of claim 9, wherein the measuring of distances to the pavement comprises periodically measuring distances to the pavement, and wherein the measuring vehicle slope comprises periodically measuring vehicle slope, wherein the determining vehicle position comprises periodically determining vehicle position, coordinating with the computer the periodical measurements of pavement distances, vehicle slopes and vehicle position, and wherein the recording comprises periodically recording the pavement cross-slope and the position of the pavement cross-slope.

18. The method of claim 9, wherein the positional device comprises a global positioning system device for determining exact global position of the vehicle, and a travel distance measurement instrument connected to the vehicle for measuring distance travel by the vehicle.

* * * * *